United States Patent [19]

Kirby

[11] Patent Number: 4,514,901

[45] Date of Patent: May 7, 1985

[54] METHOD AND APPARATUS FOR ATTACHING MOUNTING PLATES

[75] Inventor: Edward R. Kirby, Dallas, Tex.

[73] Assignee: Associated Truss Company, Dallas, Tex.

[21] Appl. No.: 496,846

[22] Filed: May 23, 1983

[51] Int. Cl.[3] .......................... B23P 19/00; B30B 3/00

[52] U.S. Cl. ........................................ 29/822; 29/798; 100/913; 100/153

[58] Field of Search ................................ 227/152-155; 100/913, 153; 29/798, 822

[56] References Cited

U.S. PATENT DOCUMENTS 3,538,843 11/1970 Lubin ................................. 100/913
3,785,277 1/1974 Schmitt .............................. 100/913
3,908,259 9/1975 Adams ............................... 100/913
4,295,269 10/1981 Wright ............................... 100/913

*Primary Examiner*—Howard N. Goldberg
*Assistant Examiner*—Steven Nichols
*Attorney, Agent, or Firm*—Kanz, Scherback & Timmons

[57] ABSTRACT

A method and apparatus for attaching mounting plates (12 and 14) to a workpiece such as a strut (16) is disclosed. First and second conveyors (34 and 36) carry the mounting plates with the workpiece positioned above them past first and second rollers (40 and 42) respectively. The rollers have ribs which form circumferential grooves aligned to allow passage of rows of prongs (18) while the ribs extend sufficiently close to the conveyors to make contact with the workpiece and to force rows of holes 24 in the workpiece down over the prongs.

4 Claims, 2 Drawing Figures

METHOD AND APPARATUS FOR ATTACHING MOUNTING PLATES

DESCRIPTION

1. Technical Field

The present invention relates generally to attaching mounting plates to workpieces and in one of its aspects to the manufacture of struts for trusses.

In the manufacture of certain workpieces such as struts which are to be put into a final framework such as a truss by means of mounting plates having prongs, it has been common practice to pre-attach the mounting plates through holes in the workpiece where the prongs of the mounting plate have an interference fit with the holes.

2. Background Art

It has been common practice for assembly line workers to attach mounting plates to workpieces by tapping the workpiece with a hammer in the vicinity of the holes which are to fit over the prongs of the mounting plates. Such a method has been slow and tedious.

Grooved rollers are well known. A grooved roller used for compressing material into strips is shown in U.S. Pat. No. 3,879,157 of Heesen. Another grooved roller used for removal of water, liquors or other liquids from soaked masses of fibrous materials is shown in U.S. Pat. No. 2,365,658 of Schumacher. A grooved roller for use in the paper industry is shown in U.S. Pat. No. 3,845,534 of Kusters et al.

DISCLOSURE OF INVENTION

An apparatus according to the present invention for attaching mounting plates having substantially parallel rows of prongs to a workpiece which forms rows of holes for receiving some of the prongs in an interference fit includes a conveyor for carrying the mounting plate and the workpiece positioned above the mounting plate in a direction substantially parallel with the rows of prongs, a roller positioned above the conveyor and means for turning the roller. The roller has ribs which form circumferential grooves aligned to allow passage of the rows of prongs. The ribs themselves extend sufficiently close to the conveyor to make contact with the workpiece and force the rows of holes down over the prongs. The means for turning the roller turns at a speed so that the bottom of the ribs move in the direction of travel of the mounting plate on the conveyor and at substantially the same speed so that there is no substantial slippage between the ribs and the workpiece or between the mounting plate and the conveyor.

In a particular arrangement according to the present invention for attaching mounting plates to the two ends of a strut having substantially flat coplanar ends, a conveyor means carries the two mounting plates spaced apart and the strut positioned above the mounting plates where the rows of holes and the flat ends align with the prongs to be received. Once again the conveyor carries the mounting plates and strut in a direction substantially parallel with the rows of prongs. Roller means positioned above the conveyor means has ribs which form circumferential grooves aligned to allow passage of the rows of prongs and as in the other arrangement, the ribs extend sufficiently close to the conveyor to make contact with the flat ends of the strut and to force the rows of holes down over the prongs. In a particular arrangement the conveyor means includes a first conveyor carrying one of the mounting plates and a second conveyor spaced apart from but substantially parallel to the first conveyor for carrying the other mounting plate. The roller means comprises first and second rollers positioned above the first and second conveyors respectively. In one such arrangement, each conveyor forms a groove for receiving a mounting plate. The mounting plates are thus correctly positioned in one direction for the particular strut.

These and other objects, advantages and features of the invention will become apparent from the following description, reference being had to the accompanying drawing.

BEST MODE FOR CARRYING OUT THE INVENTION

Figure 1:
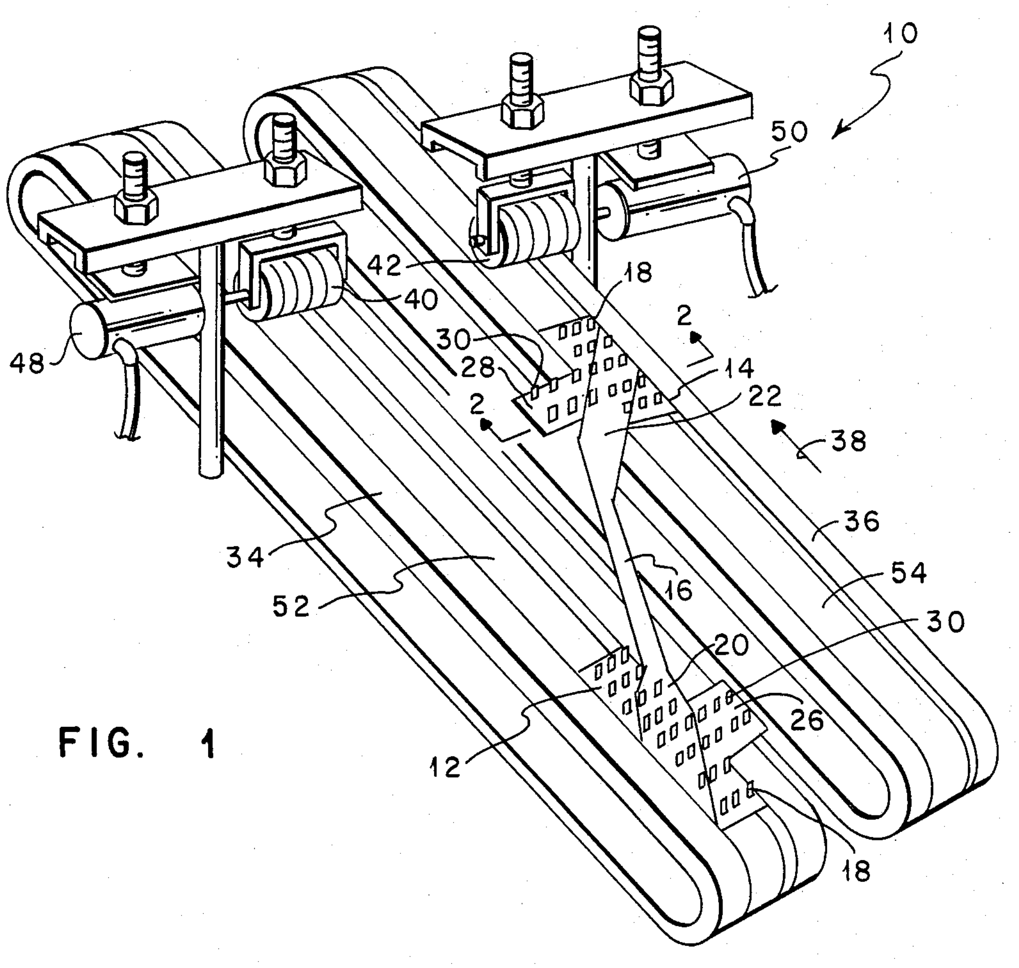
FIG. 1 is a perspective view of an apparatus according to the present invention for attaching mounting plates to a strut.
Figure 2:
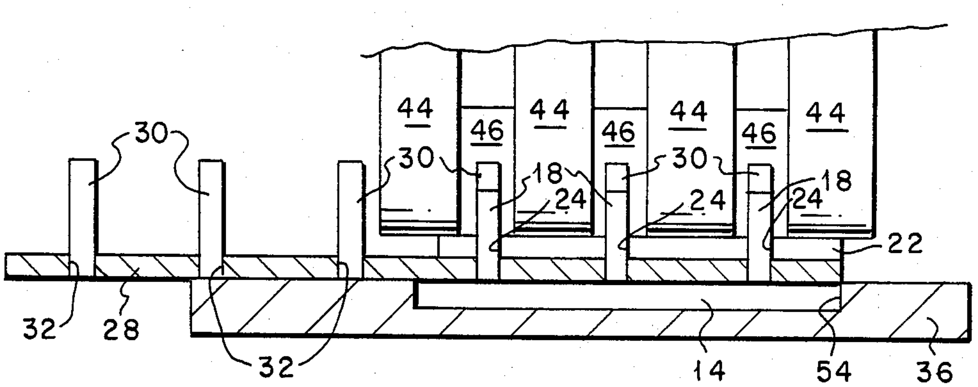
FIG. 2 is an enlarged view taken along lines 2—2 of FIG. 1.

Referring now to the drawing and in particular to FIG. 1, an apparatus according to the present invention is referred to generally by reference numeral 10. Apparatus 10 is for attaching mounting plates 12 and 14 to a strut 16. Mounting plates 12 and 14 have substantially parallel rows of prongs 18, and strut 16 has substantially flat coplanar ends 20 and 22 which form rows of holes for receiving some of the prongs in an interference fit, as seen more clearly in FIG. 2.

In the particular arrangement shown, additional mounting plates 26 and 28 are attached to each end 20 and 22 respectively of strut 16. Additional mounting plates 26 and 28 also form rows of prongs 30 which align with holes 24. Prongs 30 are formed by cutouts from mounting plate 28 so that holes 32 are formed where the two mounting plates overlap. Holes 32 thus receive prongs 18 of mounting plate 14 and holes 24 of flat end 22 receive both prongs 18 and prongs 30 where the flat ends overlaps the appropriate mounting plates.

Apparatus 10 includes conveyor means comprising a first conveyor 34 for carrying one of the mounting plates 12 and a second conveyor 36 spaced apart from and substantially parallel to first conveyor 34 for carrying the other mounting plate 14. The conveyor means carries the two mounting plates spaced apart and strut 16 positioned above the mounting plates with the rows of holes 24 of flat ends 20 and 22 aligned with prongs 18 to be received. Conveyors 34 and 36 carry the mounting plates and strut in a direction 38 which is substantially parallel with the rows of prongs.

Roller means comprising first and second rollers 40 and 42 positioned above first and second conveyors 34 and 36 respectively have ribs 44 which form circumferential grooves 46 aligned to allow passage of the rows of prongs 18 and 30. Ribs 44 extend sufficiently close to conveyor 36 to make contact with flat end 22 and to force the rows of holes 24 down over prongs 18 and 30. Means comprising motors 48 and 50 are operatively connected to rollers 40 and 42 respectively for turning the rollers. Motors 48 and 50 turn the rollers in a direction so that the bottom of ribs 44 move in the direction of travel 38 of the mounting plates and at substantially the same speed as the mounting plates.

Each conveyor 34 and 36 forms a groove 52 and 54 respectively for receiving mounting plates 12 and 14 respectively. Mounting plates 12 and 14 are thus automatically correctly positioned in the direction transverse to direction 38 for the particular strut 16. The rows of prongs are also thus automatically correctly aligned.

In general, an apparatus according to the present invention is for attaching a mounting plate having substantially parallel rows of prongs to a workpiece such as a strut which forms rows of holes for receiving some of the prongs in an interference fit. Such an apparatus includes a conveyor for carrying the mounting plate and the workpiece positioned above the mounting plate in a direction substantially parallel with the rows of prongs, a roller positioned above the conveyor, having ribs which form circumferential grooves aligned to allow passage of the rows of prongs and means for turning the roller. The ribs of the roller extend sufficiently close to the conveyor to make contact with the workpiece and to force the rows of holes down over the prongs. In the particular embodiment illustrated, roller 40 and conveyor 34 operate on substantially flat end 20 of strut 16 and mounting plates 12 and 26 in the same fashion of that described for substantially flat end 22.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. An apparatus for attaching a mounting plate having substantially parallel rows of prongs to a workpiece which forms rows of holes for receiving some of the prongs in an interference fit wherein the prongs extend substantially beyond the workpiece for further attachment to another object, comprising in combination:

a conveyor for carrying the mounting plate and the workpiece positioned above the mounting plate in a direction substantially parallel with the rows of prongs;

a roller positioned above the conveyor, having ribs which form circumferential grooves aligned to allow passage of the rows of prongs wherein the ribs extend sufficiently close to the conveyor to make contact with the workpiece and to force the rows of holes down over the prongs; and means for turning the roller wherein the bottom of the ribs move in the direction of travel of the mounting plate and at substantially the same speed as the mounting plate.

2. An apparatus for attaching mounting plates having substantially parallel rows of prongs to a strut having substantially flat coplanar ends which form rows of holes for receiving some of the prongs in an interference fit wherein the prongs extend substantially beyond the substantially flat coplanar ends for further attachment to part of a framework, comprising in combination:

conveyor means for carrying two mounting plates spaced apart and the strut positioned above the mounting plates with the rows of holes in the flat ends aligned with the prongs to be received, in a direction substantially parallel with the rows of prongs;

roller means positioned above the conveyor means, having ribs which form circumferential grooves aligned to allow passage of the rows of prongs wherein the ribs extend sufficiently close to the conveyor to make contact with the flat ends and to force the rows of holes down over the prongs; and means for turning the roller means wherein the bottom of the ribs move in the direction of travel of the mounting plates and at substantially the same speed as the mounting plates.

3. An apparatus according to claim 2 wherein the conveyor means comprises a first conveyor for carrying one of the mounting plates and a second conveyor spaced apart from and substantially parallel to the first conveyor for carrying the other mounting plate and the roller means comprises first and second rollers positioned above the first and second conveyors respectively.

4. An apparatus according to claim 3 wherein each conveyor forms a groove for receiving a mounting plate wherein the mounting plates are correctly positioned in one direction for the particular strut.

* * * * *